United States Patent
Mo et al.

(10) Patent No.: US 10,404,790 B2
(45) Date of Patent: Sep. 3, 2019

(54) HTTP SCHEDULING SYSTEM AND METHOD OF CONTENT DELIVERY NETWORK

(71) Applicant: WANGSU SCIENCE & TECHNOLOGY CO., LTD., Shanghai (CN)

(72) Inventors: Xiaoqi Mo, Shanghai (CN); Zhaoyin Ruan, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 88 days.

(21) Appl. No.: 15/525,042

(22) PCT Filed: Dec. 30, 2014

(86) PCT No.: PCT/CN2014/095485
§ 371 (c)(1),
(2) Date: May 5, 2017

(87) PCT Pub. No.: WO2016/074323
PCT Pub. Date: May 19, 2016

(65) Prior Publication Data
US 2018/0288141 A1    Oct. 4, 2018

(30) Foreign Application Priority Data

Nov. 11, 2014  (CN) .......................... 2014 1 0631207

(51) Int. Cl.
*H04L 29/08* (2006.01)
(52) U.S. Cl.
CPC .......... *H04L 67/1008* (2013.01); *H04L 29/08* (2013.01); *H04L 67/02* (2013.01);
(Continued)

(58) Field of Classification Search
None
See application file for complete search history.

(56) References Cited

U.S. PATENT DOCUMENTS 6,108,703 A    8/2000  Leighton et al.
7,340,532 B2 *  3/2008  Swildens ............... H04L 29/06
                                                709/203
(Continued)

FOREIGN PATENT DOCUMENTS

| CN | 102148752 A | 8/2011 |
| CN | 102195788 A | 9/2011 |
| WO | 2010023424 A | 3/2010 |

OTHER PUBLICATIONS

The European Patent Office (EPO) The extended European search report for 140905704.4 dated May 11, 2018 9 Pages.
(Continued)

*Primary Examiner* — Thomas J Dailey
(74) *Attorney, Agent, or Firm* — Anova Law Group, PLLC (57) ABSTRACT

The present disclosure provides a hypertext transfer protocol (HTTP) scheduling system for content delivery network (CDN), including a central decision-making server, one or more central scheduling servers, and one or more edge scheduling servers. The central decision-making server is configured to generate central decision-making files based on bandwidths and load information of global server clusters. The central scheduling servers are connected to the central decision-making server, the central scheduling servers being configured to execute the central decision-making files, when receiving a client content request, based on a geographic location and a content of the client content request, to select a preferred server cluster and a backup server cluster, and to further return a re-directing address with an address of the preferred server cluster and an address
(Continued)

of the backup server cluster to the client. The edge scheduling servers are configured to be in a corresponding edge server cluster.

12 Claims, 5 Drawing Sheets

(52) U.S. Cl.
CPC ...... *H04L 67/1014* (2013.01); *H04L 67/1021* (2013.01); *H04L 67/1023* (2013.01); *H04L 67/1029* (2013.01); *H04L 67/2842* (2013.01)

(56) References Cited

U.S. PATENT DOCUMENTS

| | | | |
|---|---|---|---|
| 8,239,514 B2* | 8/2012 | Richardson | H04L 67/1097 709/223 |
| 9,762,692 B2* | 9/2017 | Fullagar | H04N 7/17354 |
| 2003/0217147 A1* | 11/2003 | Maynard | H04L 29/06 709/225 |
| 2006/0015574 A1* | 1/2006 | Seed | H04L 67/1095 709/219 |
| 2011/0289214 A1 | 11/2011 | Freedman | |
| 2012/0226770 A1* | 9/2012 | Schapira | H04L 67/2804 709/217 |
| 2012/0240176 A1* | 9/2012 | Ma | H04N 21/23439 725/114 |

OTHER PUBLICATIONS

The World Intellectual Property Organization (WIPO) International Search Report for PCT/CN2014/095485, 5 pages, dated Aug. 18, 2015.

* cited by examiner

HTTP SCHEDULING SYSTEM AND METHOD OF CONTENT DELIVERY NETWORK

CROSS-REFERENCES TO RELATED APPLICATIONS

This patent application is a national phase entry under 35 U.S.C § 371 of PCT Application No. PCT/CN2014/095485 filed on Dec. 30, 2014, which claims priority of Chinese patent application No. 201410631207.9, filed on Nov. 11, 2014, the entire content of all of which is incorporated herein by reference.

FIELD OF THE DISCLOSURE

The present disclosure generally relates to the field of content delivery network, more particularly, relates HTTP scheduling system and method for content delivery network.

BACKGROUND

With the development of internet devices, internet traffic increases gradually. The scale of content delivery network (CDN) becomes larger and larger. Load balancing has become an important way of controlling costs.

The main function of the CDN includes transmitting content from the source station to the client terminal in a shortest time. The basic idea of CDN is to avoid bottlenecks and links in network that may potentially affect the speed and the stability of data transmission such that the content can be transmitted faster and better. By arranging content delivery network, formed by edge node servers in various locations of the network, the user's requests can be redirected to the best edge node that is closest to the user based on comprehensive information including network traffic, load information at each edge node, distance from an edge node to the user, and response time. In this system, a global scheduling layer is added into the existing network infrastructure, and the content provided by the source station is transmitted to the network edge that is the closest to the user so that the user can obtain the desired content, and network congestion can be improved. The response time the user accesses a website can be improved. Problems such as small bandwidth at the exit of the source station, a high volume of user access, non-uniformly distributed network outlets, complex carrier networks, and low response speed to access sites caused by the small bandwidth of the user's network.

The main load balancing techniques in conventional CDN mainly include domain name system (DNS) scheduling and hypertext transfer protocol (HTTP) scheduling. The DNS scheduling is mainly used for load balancing of images and contents of dynamic site acceleration. HTTP scheduling is based on the 30× response code of the http protocol, and is mainly used for media streaming applications. Considering that media streaming is a significant portion of the CDN business, this portion becomes an important part of the CDN to control server and computer-room load balancing.

HTTP scheduling includes a central mode and an edge mode. The central mode refers to directing the user's requests to several groups of scheduling computers through the DNS. These scheduling computers do not provide contents. Instead, the decision-making computer first analyzes the bandwidth data in all the computer rooms and server clusters of the CDN, and timely schedules the traffic of server clusters based on the bandwidth data. The scheduling computers execute the scheduling such that the load of the server clusters can be balanced. Second, the scheduling computers perform Hash calculations based on the contents of the requests, and select a desired server to reduce content redundancy among the server clusters and among servers in a server cluster. The edge mode refers to distributing the user's requests to an edge server cluster through the DNS. The scheduling computer in the edge server cluster determines the states of the edge server cluster and the computer room. The scheduling machine determines whether to provide local service or to request a redirection to a backup server cluster to obtain load balancing.

BRIEF SUMMARY OF THE DISCLOSURE

The present disclosure provides a solution to a technical problem. The present disclosure provides a novel HTTP scheduling system and method.

The present disclosure provides a hypertext transfer protocol (HTTP) scheduling system for content delivery network (CDN), including: a central decision-making server, configured to generate central decision-making files based on bandwidths and load information of global server clusters; one or more central scheduling servers, connected to the central decision-making server, the central scheduling servers being configured to execute the central decision-making files, when receiving a client content request, based on a geographic location and a content of the client content request, to select a preferred server cluster and to determine whether a backup server cluster needs to be selected simultaneously, to further return a re-directing address with an address of the preferred server cluster to the client, and to simultaneously return a re-directing address to the client with an address of the backup server cluster when a backup server cluster is selected; and one or more edge scheduling servers, configured to be in a corresponding edge server cluster, wherein, when receiving the client content request, each edge scheduling server obtains a bandwidth and load information of the corresponding edge scheduling server if the backup server cluster is included and determines if the client content request needs to be directed to the backup server cluster.

In one embodiment, the central decision-making server determines weight values of a plurality of server clusters in each one of a plurality of coverage domains to control traffic in each server cluster, the coverage domains being divided in advance based on sites accessed by clients and geographic locations of the clients.

In one embodiment, the central scheduling servers are configured to perform a hashing calculation and random weight calculation based on the client request to select a preferred server cluster from a list of server clusters, and further selects the backup server cluster from the list of server clusters if the backup server cluster is needed, the backup server cluster having spare capacity to provide service.

In one embodiment, when receiving the client content request, the one or more edge scheduling servers are configured to determine if the corresponding edge server cluster is overloaded, when the corresponding edge server cluster is overloaded, the one or more edge scheduling servers determine if the client content request contains information of the backup server cluster; if the request includes the information of the backup server cluster, the one or more edge scheduling servers return a re-directing address to direct the client to the backup server cluster, if the request contains no information of the backup server cluster, the one or more edge scheduling servers function as a proxy between the client and cache servers in the corresponding edge server cluster to provide service; and if the corresponding edge server cluster is not overloaded, the one or more edge scheduling servers function as the proxy between the client and cache servers in the corresponding edge server cluster to provide service.

In one embodiment, the one or more edge scheduling servers obtain bandwidth data at nodes on a regular basis, calculate a number of allowed connections in next time interval; and in the next time interval, first requests determined by the number of allowed connections are directed to the corresponding edge server cluster for service, and request after are directed to the backup server cluster.

Another aspect of the present disclosure further provides a hypertext transfer protocol (HTTP) scheduling method for content delivery network (CDN), including: generating central decision-making files, by a central decision-making server, based on bandwidths, load information, network condition, and cost information of global server clusters; executing the central decision-making files, by one or more central scheduling servers, connected to the central decision-making server, when receiving a client content request, based on a geographic location and content of the request, selecting a preferred server cluster, determining whether a backup server cluster needs to be selected simultaneously, further returning a re-directing address with addresses of the preferred server cluster and the backup server cluster to the client, and simultaneously returning a re-directing address to the client with an address of the backup server cluster when the backup server cluster is selected; and when receiving the client content request, by each of the one or more edge scheduling servers being in a corresponding edge server cluster and being connected to the one or more central scheduling servers, obtaining a bandwidth and load information of the corresponding edge scheduling server cluster if the backup server cluster is included, and determining if the client content request needs to be directed to the backup server cluster.

In one embodiment, a process the central decision-making server generates the decision-making files includes: determining weight values of a plurality of server clusters in each one of a plurality of coverage domains to control traffic in each server cluster, the coverage domains being divided in advance based on sites accessed by clients and geographic locations of the clients.

In one embodiment, a process performed in the central scheduling servers includes: based on server clusters associated with the client, obtaining a list of server clusters; based on the client content request, performing a hashing calculation and random weight calculation, and selecting a preferred server cluster from the list of server clusters; and if a backup server cluster is to be selected, further selecting a backup server cluster with spare capacity for service from the list of server clusters.

In one embodiment, a process the one or more edge scheduling servers execute when receiving the client content request includes: determining, by the one or more edge scheduling servers, if the corresponding edge server cluster is overloaded; when the corresponding edge server cluster is overloaded, determining, by the one or more edge scheduling servers, if the request contains information of the backup server cluster; if the request includes the information of the backup server cluster, the one or more edge scheduling servers returning a re-directing address to direct the client content request to the backup server cluster, if the request contains no information of the backup server cluster, the one or more edge scheduling servers functioning as a proxy between the client and cache servers in the corresponding edge server cluster to provide service; and if the corresponding edge server cluster is not overloaded, functioning, by the one or more edge scheduling servers, as the proxy between the client and cache servers in the corresponding edge server cluster to provide service.

In one embodiment, the one or more edge scheduling servers obtain bandwidth data at nodes on a regular basis, calculate a number of allowed connections in next time interval; and in the next time interval, first requests determined by the number of allowed connections are directed to the corresponding edge server cluster for service, and request after are directed to the backup server cluster.

Thus, by applying the above-mentioned technical solution, the clients' request may be obtained through the central scheduling servers, and information of the preferred server cluster and the backup server cluster may be returned. In addition, the edge server clusters may make correction to the distribution made through central scheduling based on the bandwidth and load information of local server cluster. Through the macro-control by the central scheduling and the adjustment by the edge scheduling, the system may be of lower cost and may have improved performance. The edge server clusters may not be overloaded.

BRIEF DESCRIPTION OF THE DRAWINGS

To make the above objects, features, and advantage of the disclosure more apparent and easy to understand, specific embodiments of the present disclosure will now be described in detail with reference to the drawings of the present disclosure.

DETAILED DESCRIPTION

Conventional HTTP scheduling includes a central mode and an edge mode. The two modes each has its own particularity, and are thus applied in practice to a certain degree. However, the two modes each has some defects. The defects of the central mode include requiring to collect the CDN platform data for a certain amount of time before traffic scheduling. Taking into account the time for decision making, this mode can cause delay, which leads to error. In addition, because of the limitations of the HTTP scheduling, when controlling traffic, it is only ensured that the requests are distributed according to certain proportions. The HTTP scheduling does not ensure the amounts of traffic distributed is in accordance with the proportions the requests are distributed. That is, the central mode has error and is lack of scheduling accuracy at the same time. The defects of the edge mode include, in this mode, the scheduling among server clusters is implemented through DNS. Content control may not be implemented among server clusters. Data redundancy is high, which causes a waste of storage and bandwidth resources. In addition, in this mode, the controller is distributed in an edge server cluster. When the controlling overload in server clusters, it may not be ensured that the traffic is directed to a suitable server cluster.

Embodiments of the present disclosure provide a novel HTTP scheduling method. The HTTP scheduling method provides performance that is better than the performances of the central mode and the edge mode.

Figure 1:
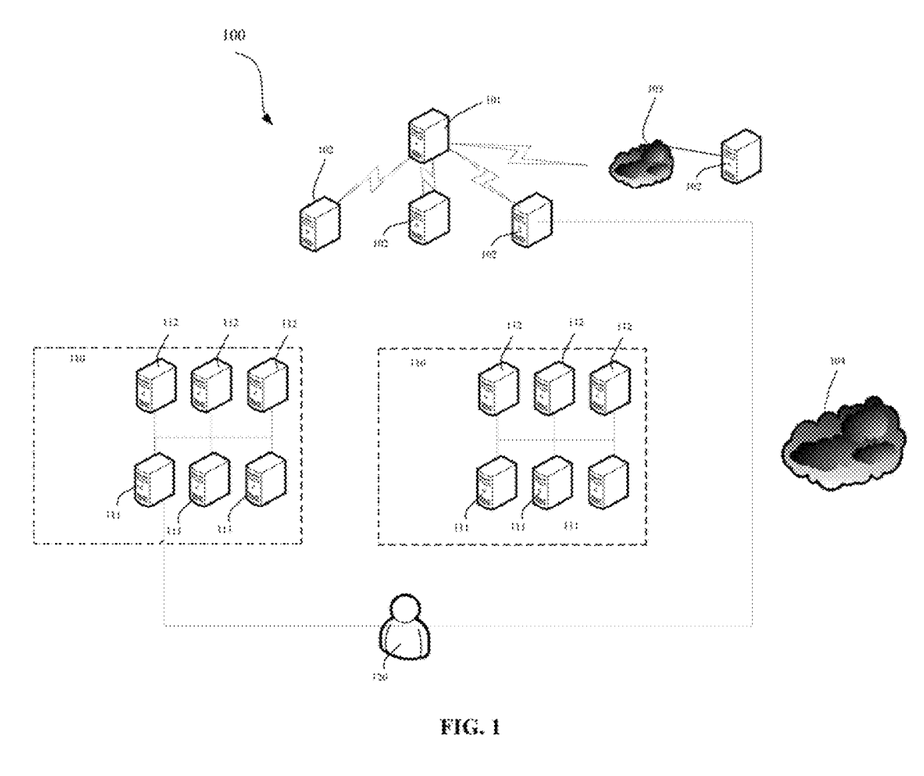
FIG. 1 illustrates an exemplary network implementation environment consistent with the disclosed embodiments of the present disclosure.

FIG. 1 illustrates an exemplary network implementation environment of the present disclosure. As shown in FIG. 1, a CDN 100 may include a central decision-making server 101, a plurality of central scheduling servers 102, and a plurality of edge server clusters 110. These devices may be connected through a network. Each edge server cluster 110 may include edge scheduling servers 111 and cache servers 112. A central scheduling server 102 may be directly connected to the central decision-making server 101, or may be connected to the central decision-making server 101 through another network 103.

Many clients 120 may be connected to the CDN 100 to obtain the requested contents.

The central decision-making server 101 may be configured to generate a central decision-making file based on the global bandwidths of the server clusters, the load information, the network condition, and the cost information of bandwidths.

Each central scheduling server 102 may be configured to execute the central decision-making file. When receiving a content request from a client, the central scheduling servers 102 may select a preferred server cluster based on the geographic location of the client and the content of the request and may return a re-directing uniform resource locator (URL) with information of the preferred server cluster and a backup server cluster. If needed, each central scheduling server 102 may simultaneously select the backup server cluster and may return a re-directing URL with information of the backup server cluster. The URL may be the address of a standard resource in the network. The preferred server cluster may be a server cluster that is the first to process the client's request. The backup server cluster may provide the requested content to the client when the preferred server cluster is overloaded or is not able to respond to the client's request.

An edge scheduling server 111 may be configured to obtain the bandwidth and load condition of the local server cluster (the server cluster that contains the edge scheduling server 111) when receiving a client's request. The edge scheduling server 111 determines whether the request should be directed to a backup server cluster based on the bandwidth and load condition of the local server cluster. A cache server 112 may be configured to provide content requested by the client 120.

Figure 2:
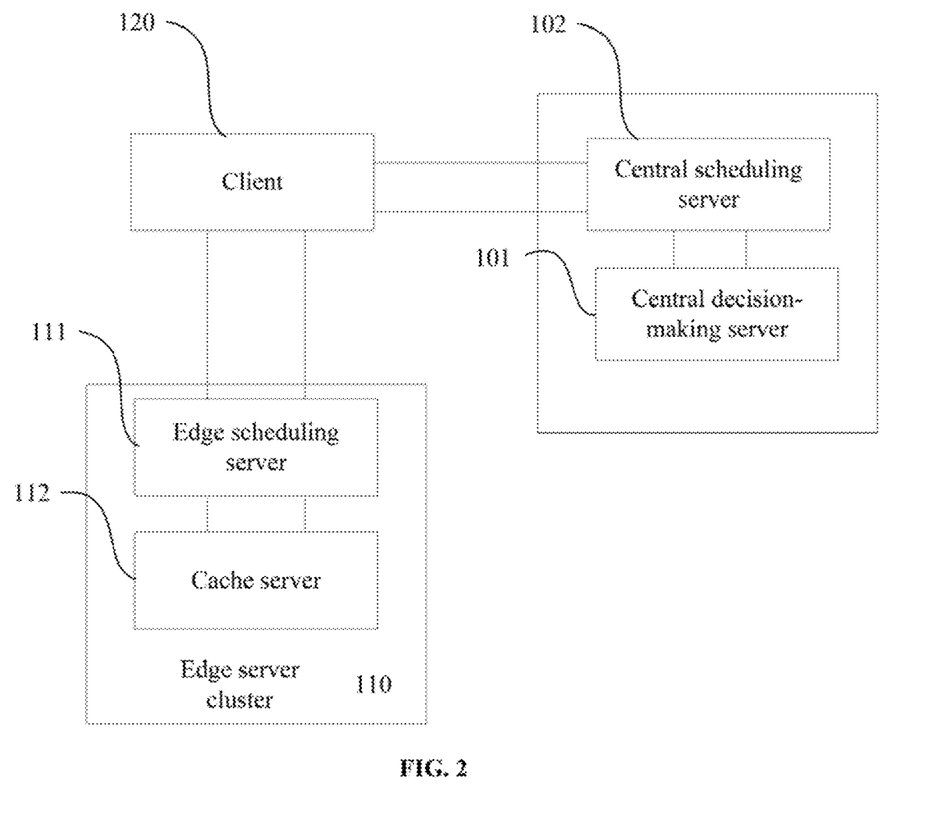
FIG. 2 illustrates an exemplary scheduling system consistent with the disclosed embodiments of the present disclosure.

FIG. 2 illustrates an exemplary block diagram of the scheduling system provided by the present disclosure. As shown in FIG. 2, a typical scheduling system may include a central decision-making server 101, a central scheduling server 102, and an edge scheduling server 111. The scheduling system may provide service to the client 120. The client 120 may request and track contents. The client 120 may also store files and display certain contents.

The central decision-making server 101 may store and execute a central decision-making module 201. When the central decision-making module 201 is being execute, the central decision-making server 101 may be configured to generate a central decision-making file based on the bandwidths and load information of the global service clusters. The central decision-making server 101 may send the central decision-making file to the central scheduling server 102. The central scheduling server 102 may store and execute a central scheduling module 202. When the central scheduling module 202 is being executed, the central scheduling server 102 may be configured to execute the central decision-making file. When receiving a client's request, the central scheduling server 102 may select a preferred server cluster and a backup server cluster based on the client's geographic location and the content of the request. The central scheduling server 102 may return a re-directing URL, containing information of the preferred server cluster and the backup server cluster, to the client. The edge scheduling server 111 may store and execute an edge scheduling module 203. When the edge scheduling module 203 is being executed, the edge scheduling server 111 may be configured to obtain the bandwidth and load information of the local server cluster. If a backup server cluster is included in the re-directing URL, the edge scheduling module 203 may determine whether the request should be directed to the backup server cluster.

The edge scheduling server 111 may also store and execute a local load balancing module 204. When the local balancing module 204 is being executed, the edge scheduling server 111 may be configured to be a proxy for the cache server 112.

Each one of servers 101, 102, and 111 may include a processor, a memory, and a storage. Each module, e.g., the central decision-making module 201, the central scheduling module 202, the edge scheduling module 203, and the local load balancing module 204 may be stored in the storage in the form of software, and may be loaded into the random-access memory (RAM) to be executed by the processor.

In this system, after the central scheduling server obtains the client's request, the preferred server cluster and the backup server cluster may be returned. The edge server cluster, used as the preferred server cluster, may correct the distribution of the central scheduling based on the bandwidth and the load of the local server cluster. For example, the edge server cluster may direct the user's request to the backup server cluster. Thus, in the present system, through the macro-control by the central scheduling and the adjustment by the edge scheduling, the system may be of lower cost and may have improved performance. The edge server clusters may not be overloaded.

Figure 3:
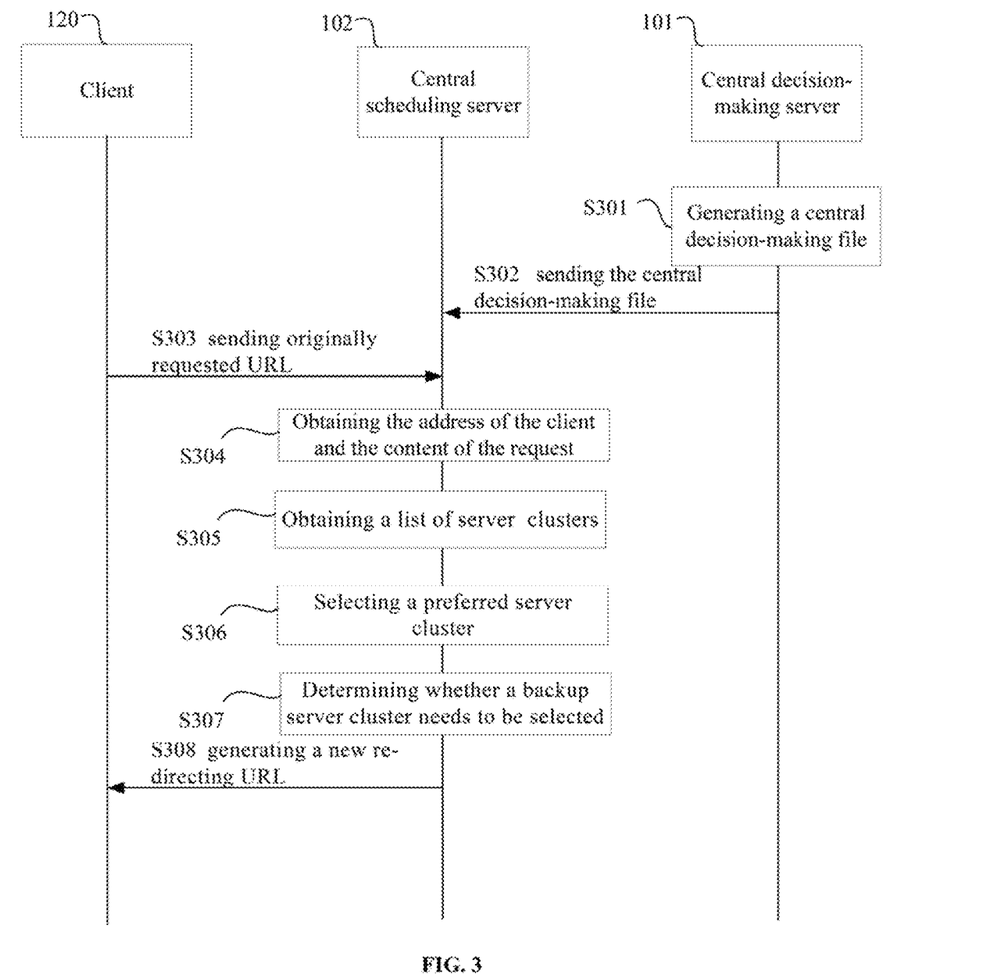
FIG. 3 illustrates an exemplary process flow of a central scheduling module consistent with the disclosed embodiments of the present disclosure.

FIG. 3 illustrates an exemplary process flow of a central decision-making server and a central scheduling server. As shown in FIG. 3, in step S301, the central decision-making server 101 may be configured to collect the bandwidths and load information of all the edge server clusters on the platform and periodically generate central decision-making files that include information such as weight values of coverage domains. In step S302, the central decision-making server 101 may send a central decision-making file to all the central scheduling servers 102. A coverage domain may refer to a combination of geographic regions and a range of clients, generated from dividing traffic based on the sites the clients access and the clients' addresses (such as IP addresses). The geographic regions may refer to the coverage of a province or a city. A range of clients may refer to, e.g., a predetermined client group. A coverage domain may include a plurality of edge server clusters, i.e., a plurality of groups. That is, the weight values of the server clusters may be used to control the traffic in each server cluster.

The specific process flow may include steps 1-3.

In step 1, the bandwidths at nodes may be predicted through the following method.

The bandwidth data of a node at the most recent point in time may be obtained. The maximum bandwidth data and the minimum bandwidth data may be removed. Least square method may then be used to fit the data into the following equation bw=a*t+b.

The values of "a" and "b" may be calculated. Then t', which represents the point in time after one minute, may substitute t to calculate a predicted bandwidth value BW_pop.

In step 2, all the coverage domains may be traversed to satisfy the following conditions.

It may be defined that, 1. "farm" may be an edge server cluster, and may be a basic unit of weight scheduling by the central decision-making server 101; 2. a plurality of "farm"s in a same region may form a "pop", where "pop" represents a network access point of a plurality of server clusters agreed on by the carriers.

The amount of bandwidth change may be ΔBW_farm=ΔW_farm*BW_cover/ΣW_farm.

The bandwidth at a network access point may be the sum of bandwidths of associated server clusters: BW_pop=ΣBW_farm.

The new bandwidth value of an edge server cluster may not be greater than the service capacity of the edge server cluster, to control the traffic in the server cluster to be within the predetermined upper limit: Capacity_farm>=BW_farm+ΔBW_farm.

The new bandwidth at a node may not be greater than the upper limit of the bandwidth of the server cluster: Capacity_pop>=BW_pop+Σ ΔBW_farm.

Under the above constraints, the central decision-making server may try to find a solution such that Σ|ΔBW_pop| may be minimum. That is, the traffic among a plurality of server clusters in the coverage domains may be minimum. Thus, the bandwidth of a node may be ensured to be stable. Meanwhile, decrease in the hit ratio of the cache server 112, caused by migration of bandwidths among nodes, may be reduced.

It should be noted that, BW_farm may represent the bandwidth of "farm", BW_cover may represent the bandwidth of a coverage domain, W_farm may represent the weight value of "farm", Capacity_farm may represent the maximum bandwidth that "farm" provides service, Capacity_pop may represent the maximum bandwidth that "pop" provides service, and Δ may represent the amount of bandwidth change after weight value scheduling.

In step 3, the weight proportion of each server cluster in each coverage domain (W_farm) may be obtained.

In step S303, client 120 may send the originally requested URL.

In step S304, the central scheduling server 102 may obtain the client's address and the content of the request.

In step S305, the central scheduling server 102 may obtain a list of server clusters by determining the server clusters that include the client.

In step S306, the central scheduling server 102 may perform a hashing calculation and random weight calculation to select a preferred server cluster from the list of server clusters.

In step S307, a backup server cluster may be determined. If a backup server is needed, the backup server cluster may be selected from the list of server clusters. It may be ensured that the backup server cluster has spare service capacity.

In step S308, the central scheduling server 102 may generate a new re-directing URL based on the originally requested URL, the preferred server cluster, and the backup server cluster, and return the new re-directing URL to the client 120.

The method to determine the IP address of the preferred server cluster and the IP address of the backup server cluster may be exemplified as follows.

First, the coverage domain may be determined based on the IP address and the domain name of the request.

Second, the number of access to the URL may be counted and whether the URL is a hotspot URL may be determined.

Third, if the URL is a hotspot URL, based on the weight proportions of the server clusters in the coverage domains, the IP address of the preferred server cluster may be selected randomly; if the URL is a non-hotspot URL, the IP address of the preferred server cluster may be obtained by performing a hashing calculation based on the URL.

Fourth, if the URL is a hotspot URL, after the server cluster with the IP address of the preferred server cluster is removed, based on the weight proportions, an IP address may be randomly re-selected from the selectable backup server clusters.

Considering the volume of access to a hotspot URL is relatively high, the URL may be accessed many times after being stored by the cache server 112. Thus, load balancing among server clusters may be ensured by scheduling a hotspot URL. In addition, the volume of access to a non-hotspot URL is relatively low, the stability of scheduling may be ensured by hashing the URLs. Repeating contents among cache servers 112 may be reduced.

Figure 4:
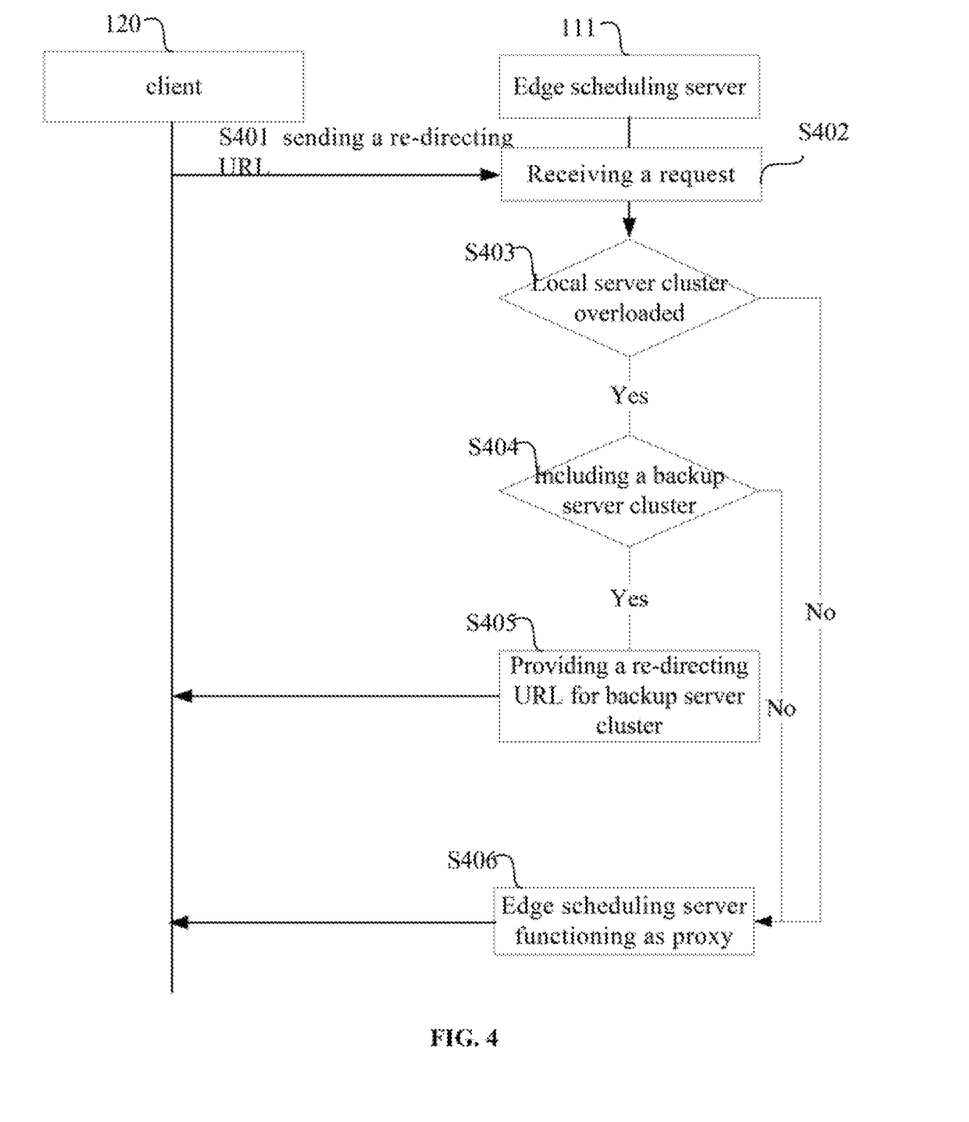
FIG. 4 illustrates an exemplary process flow of an edge scheduling module consistent with the disclosed embodiments of the present disclosure.

FIG. 4 illustrates an exemplary process flow of edge scheduling servers. As shown in FIG. 4, in step S401, a client 120 may send a request, and the request may be obtained by being directed to the central scheduling server 102. In step S402, the edge scheduling server 111 may receive the request. In step S403, the edge scheduling server 111 may determine if local server cluster is overloaded. If the local server cluster is overloaded, in step S404, the edge scheduling server 111 may further determine if the request contains information of the IP address of the backup server cluster. If the request contains information of the IP address of the backup server cluster, the URL may be returned to the client 120 in step S405 such that the client 120 may be re-directed to the backup server cluster. If the request contains no information of the IP address of the backup server cluster, the edge scheduling server 111 may function as the proxy for the client 120 and the local cache server 112 to provide service. If the local server cluster is not overloaded, the edge scheduling server 111 may function as the proxy for the client 120 and the local cache server 112 to provide service.

The method to determine a re-directing of the edge scheduling server 111 may be as follows.

First, the edge scheduling server 111 may obtain the bandwidth data BW at nodes on a regular basis (the time interval may be, e.g., 10 seconds), and substitute the bandwidth data into the equation:

Request_Allow=max(0,Capacity−BW)/BW_Per_Request(Capacity may be the upper limit of bandwidth at a node).

The number of local connections Request_Allow, allowed in next interval, may be obtained.

Second, the load of the local server cluster Load_current and the threshold value of the local server cluster Load_max may be obtained. If Load_current>Load_max, in next interval, all requests may be directed to the IP address of the backup server cluster.

Third, in the next interval, the first requests allowed by Request_Allow may be directed to the local server cluster for service, and the requests after may be directed to the IP address of the backup server cluster.

Figure 5:
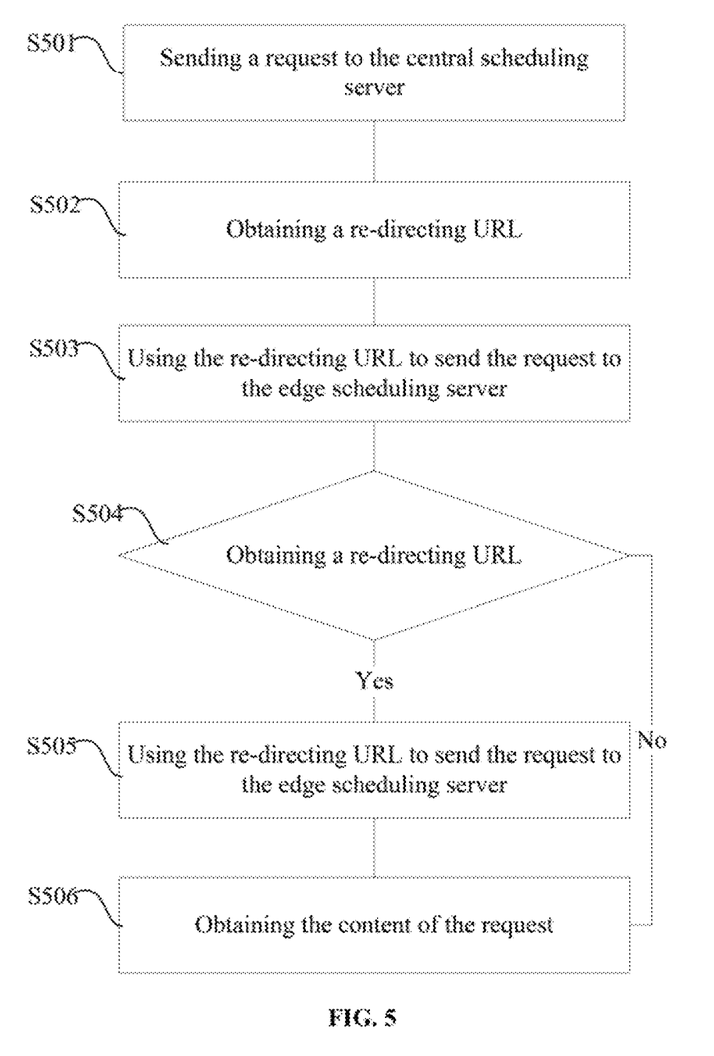
FIG. 5 illustrates an exemplary process flow of a client module consistent with the disclosed embodiments of the present disclosure.

FIG. 5 illustrates an exemplary process flow of a client. As shown in FIG. 5, in step S501, the client 120 may send a request to the central scheduling server 102. In step S502, the client 120 may obtain the 302 re-directing URL returned by the central scheduling server 102. In step S503, the client 120 may send a request, after receiving the re-directing URL to the edge scheduling server 111. In step S504, if the client receives a 302 re-directing URL, the process may proceed to step S505. In step S506, the content directly returned by the edge scheduling server 111 may be obtained. The content may be saved locally or may be displayed.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

What is claimed is:

1. A hypertext transfer protocol (HTTP) scheduling system for a content delivery network (CDN), comprising:
    memories storing instructions, and
    processors coupled to the memories and, when executing the instructions, the processors configuring:
        a central decision-making server to generate central decision-making files based on bandwidths and load information of global server clusters;
        one or more central scheduling servers, connected to the central decision-making server, to execute the central decision-making files, when receiving a client request, to select a preferred server cluster based on a geographic location and a content of the client request, to determine whether a backup server cluster needs to be selected simultaneously, to further return a re-directing address with an address of the preferred server cluster to the client, and to simultaneously return a re-directing address with an address of the backup server cluster when a backup server cluster is selected; and
        one or more edge scheduling servers to be in a corresponding edge server cluster, wherein, when receiving the client request, each edge scheduling server is configured to obtain a bandwidth and load information of a corresponding edge scheduling server if the backup server cluster is included and determines if the client request needs to be directed to the backup server cluster, wherein:
            when receiving the client request, the one or more edge scheduling servers are configured to determine if the corresponding edge server cluster is overloaded,
            when the corresponding edge server cluster is overloaded, the one or more edge scheduling servers determine if the client request contains information of the backup server cluster;
            if the client request includes the information of the backup server cluster, the one or more edge scheduling servers return a re-directing address to direct the client to the backup server cluster,
            if the client request contains no information of the backup server cluster, the one or more edge scheduling servers function as a proxy between the client and cache servers in the corresponding edge server cluster to provide service; and
            if the corresponding edge server cluster is not overloaded, the one or more edge scheduling servers function as the proxy between the client and cache servers in the corresponding edge server cluster to provide service.

2. The HTTP system for CDN according to claim 1, wherein the central decision-making server determines weight values of a plurality of server clusters in each one of a plurality of coverage domains to control traffic in each server cluster, the coverage domains being divided in advance based on sites accessed by clients and geographic locations of the clients.

3. The HTTP system for CDN according to claim 1, wherein the central scheduling servers are configured to perform Hash calculation and random weight calculation based on the client request to select a preferred server cluster from a list of server clusters, and further selects the backup server cluster from the list of server clusters if the backup server cluster is needed, the backup server cluster having spare capacity to provide service.

4. The HTTP scheduling system for CDN according to claim 1, wherein the one or more edge scheduling servers obtain bandwidth data on a regular basis, calculate a number of allowed connections in next time interval; and in the next time interval, first requests determined by the number of allowed connections are directed to the corresponding edge server cluster for service, and request after are directed to the backup server cluster.

5. A hypertext transfer protocol (HTTP) scheduling method for a content delivery network (CDN), comprising:
    generating central decision-making files, by a central decision-making server, based on bandwidths and load information of global server clusters;
    executing the central decision-making files, by one or more central scheduling servers, connected to the central decision-making server when receiving a client request, selecting a preferred server cluster based on a geographic location and content of the client request, determining whether a backup server cluster needs to be selected simultaneously, further returning a re-directing address with an address of the preferred server cluster to the client, and simultaneously returning a re-directing address with an address of the backup server cluster when a backup server cluster is selected;
    when receiving the client request, by each of one or more edge scheduling servers being in a corresponding edge server cluster, obtaining a bandwidth and load information of the corresponding edge scheduling server if the backup server cluster is included and determining if the client request needs to be directed to the backup server cluster;
    determining, by the one or more edge scheduling servers, if the corresponding edge server cluster is overloaded;
    when the corresponding edge server cluster is overloaded, determining, by the one or more edge scheduling servers, if the request contains information of the backup server cluster;
    if the request includes the information of the backup server cluster, the one or more edge scheduling servers returning a re-directing address to direct the client request to the backup server cluster,
    if the request contains no information of the backup server cluster, the one or more edge scheduling servers functioning as a proxy between the client and cache servers in the corresponding edge server cluster to provide service; and if the corresponding edge server cluster is not overloaded, functioning, by the one or more edge scheduling servers, as the proxy between the client and cache servers in the corresponding edge server cluster to provide service.

6. The HTTP scheduling method for CDN according to claim 5, wherein a process the central decision-making server generates the decision-making files includes: determining weight values of a plurality of server clusters in each one of a plurality of coverage domains to control traffic in each server cluster, the coverage domains being divided in advance based on sites accessed by clients and geographic locations of the clients.

7. The HTTP scheduling method for CDN according to claim 5, wherein a process performed in the central scheduling servers includes:
based on server clusters associated with the client, obtaining a list of server clusters;
based on the client request, performing Hash calculation and random weight calculation, and selecting a preferred server cluster from the list of server clusters; and
if a backup server cluster is to be selected, further selecting a backup server cluster with spare capacity for service from the list of server clusters.

8. The HTTP scheduling method for CDN according to claim 5, further comprising: the one or more edge scheduling servers obtaining bandwidth data on a regular basis, calculating a number of allowed connections in next time interval; and in the next time interval, first requests determined by the number of allowed connections being directed to the corresponding edge server cluster for service, and request after being directed to the backup server cluster.

9. A hypertext transfer protocol (HTTP) scheduling method for a content delivery network (CDN), comprising:
generating central decision-making files, by a central decision-making server, based on bandwidths and load information of global server clusters;
executing the central decision-making files, by one or more central scheduling servers, connected to the central decision-making server when receiving a client request, selecting a preferred server cluster based on a geographic location and content of the client request, determining whether a backup server cluster needs to be selected simultaneously, further returning a re-directing address with an address of the preferred server cluster to the client, and simultaneously returning a re-directing address with an address of the backup server cluster when a backup server cluster is selected; and
when receiving the client request, by each of one or more edge scheduling servers being in a corresponding edge server cluster, obtaining a bandwidth and load information of the corresponding edge scheduling server if the backup server cluster is included and determining if the client request needs to be directed to the backup server cluster, wherein a process the client executes comprises:
sending a request to the one or more central scheduling servers;
obtaining the re-directing address returned by the one or more central scheduling servers;
using the re-directing address to send a request to the one or more edge scheduling servers after receiving the re-directing address returned by the one or more central scheduling servers;
if the client receives a re-directing address again from the one or more edge scheduling servers, using the re-directing address from the one or more edge scheduling servers to send a request to the one or more edge scheduling servers to obtain the content of the client request; and
if the client does not receive a re-directing address from the one or more edge scheduling servers, obtaining the content of the client request from the one or more edge scheduling servers.

10. The HTTP scheduling method for CDN according to claim 9, wherein a process the central decision-making server generates the decision-making files includes: determining weight values of a plurality of server clusters in each one of a plurality of coverage domains to control traffic in each server cluster, the coverage domains being divided in advance based on sites accessed by clients and geographic locations of the clients.

11. The HTTP scheduling method for CDN according to claim 9, wherein a process performed in the central scheduling servers includes:
based on server clusters associated with the client, obtaining a list of server clusters;
based on the client request, performing Hash calculation and random weight calculation, and selecting a preferred server cluster from the list of server clusters; and
if a backup server cluster is to be selected, further selecting a backup server cluster with spare capacity for service from the list of server clusters.

12. The HTTP scheduling method for CDN according to claim 9, further comprising: the one or more edge scheduling servers obtaining bandwidth data on a regular basis, calculating a number of allowed connections in next time interval; and in the next time interval, first requests determined by the number of allowed connections being directed to the corresponding edge server cluster for service, and request after being directed to the backup server cluster.

* * * * *